US006944770B2

(12) United States Patent
Henderson et al.

(10) Patent No.: US 6,944,770 B2
(45) Date of Patent: Sep. 13, 2005

(54) METHODS AND SYSTEMS FOR GENERATING AND VALIDATING VALUE-BEARING DOCUMENTS

(75) Inventors: Verlin Ray Henderson, Raleigh, NC (US); Travis James Janovich, Wilmington, NC (US); Weigen Liang, Raleigh, NC (US); John Charles Peeples, Valdosta, GA (US)

(73) Assignee: Intelli-Mark Technologies, Inc., Raleigh, NC (US)

( * ) Notice: Subject to any disclaimer, the term of this patent is extended or adjusted under 35 U.S.C. 154(b) by 688 days.

(21) Appl. No.: 09/859,746

(22) Filed: May 17, 2001

(65) Prior Publication Data

US 2002/0188845 A1 Dec. 12, 2002

(51) Int. Cl.[7] .................................................. G06F 1/24
(52) U.S. Cl. ........................ 713/189; 713/193; 713/200; 713/201
(58) Field of Search ................................. 713/189, 193, 713/200, 201

(56) References Cited

U.S. PATENT DOCUMENTS

| | | | |
|---|---|---|---|
| 5,892,900 A | | 4/1999 | Ginter et al. |
| 5,903,652 A | * | 5/1999 | Mital ........................... 705/78 |
| 6,111,953 A | * | 8/2000 | Walker et al. ................ 380/51 |
| 6,158,003 A | * | 12/2000 | Kara ........................... 713/168 |
| 6,170,744 B1 | * | 1/2001 | Lee et al. .................... 235/380 |
| 6,223,166 B1 | | 4/2001 | Kay |
| 6,308,887 B1 | | 10/2001 | Korman et al. |
| 6,373,587 B1 | | 4/2002 | Sansone |

FOREIGN PATENT DOCUMENTS

| | | |
|---|---|---|
| GB | 2 278 002 A | 11/1994 |
| JP | 11053601 A | 2/1999 |
| WO | WO 01/33519 A1 | 5/2001 |
| WO | WO 02/25603 A1 | 3/2002 |

* cited by examiner

*Primary Examiner*—Thomas R. Peeso (57) ABSTRACT

Methods and systems for generating and validating value-bearing documents include an issuer module that receives requests for value-bearing documents. The issuer module communicates the requests to a guarantor module. The requests may include a desired security level and/or a target validator. The guarantor module generates value-bearing documents for each request and randomly or pseudo-randomly selects an encryption key from a set of encryption keys to encrypt the value-bearing document. The set of encryption keys may be a key space selected based on the target validator and/or requested security level. The guarantor module encrypts the value-bearing document using the selected encryption key and forwards the document to the issuer. The issuer forwards the encrypted value-bearing document to the requester. When the requester desires to redeem the document, the requester presents the value-bearing document to a validator. The validator extracts an index from the value-bearing document, uses the index to determine a decryption key, and validates the document using the key.

45 Claims, 9 Drawing Sheets

METHODS AND SYSTEMS FOR GENERATING AND VALIDATING VALUE-BEARING DOCUMENTS

TECHNICAL FIELD

The present invention relates to methods and systems for generating and validating documents. More particularly, the present invention relates to methods and systems generating value-bearing documents and validating the documents.

BACKGROUND ART

Value-bearing documents, such as tickets, building permits, gift certificates, etc., must be issued to requesters and validated by validators in an efficient and secure manner. For example, in ticket generation/validation systems, there must be some mechanism to prevent counterfeiting without unduly burdening the ticket validator. Accordingly, some document generation/validation systems encrypt some or all of the information in a ticket to provide security.

One problem with the use of encryption in existing document generation/validation systems is that these systems rely on a single encryption key or key pair to encrypt and validate documents. For example, in a document generation/validation system that uses symmetric encryption, a single key is used to encrypt and to validate all of the documents. If the single key is compromised, all of the documents encrypted using the single key are compromised and must be reissued. For example, in an electronic ticketing system in which all tickets are issued under the same key, and that key is deciphered by a counterfeiter, reissuing all of the tickets under a new key is required. As a result, in single-key document generation/validation systems, strong encryption algorithms and long key lengths are used to reduce the likelihood of compromise. Using strong encryption algorithms and long key lengths increases the computational burden on the entity that generates the encrypted document and the document validator.

Another problem with using a single key or key pair to validate documents is that the encryption cannot be varied to suit the needs of a particular issuer. For example, an issuer of $10 gift certificates may not be as concerned about the loss of an encryption key as the issuer of $1000 gift certificates. However, because a single key is used, the same level of encryption must be applied in both instances. Thus, conventional document generation/validation systems lack the flexibility to meet individual issuer's or issuers' needs.

Accordingly, there exists a long felt need for improved methods and systems for generating and validating value-bearing documents.

DISCLOSURE OF THE INVENTION

The present invention includes methods and systems for generating and validating value-bearing documents. As used herein, the term value-bearing document refers to information in printed or electronic format that is of monetary or other value to the bearer or owner, or any other information that requires authentication or secrecy. Examples of value-bearing documents include tickets, permits, gift certificates, gift cards, wills, legal documents, deeds, prescriptions, medical records, coupons, vouchers, financial documents, including travelers checks, money, and wire transfers, permits, passport and other identification and citizenship papers, voter registration cards, government-issued licenses and permits, certifications, such as degrees and CPA certifications, classified corporate documents, classified government documents, ballots, securities filings, other government documents, such as transcripts, documents that require notarization, lottery tickets, mail receipt confirmations, package tracking, reservation confirmations, and inventory tracking.

According to one aspect, the present invention includes a system for generating and validating a value-bearing document. The system includes a guarantor module, an issuer module, and a validator module. Each of the modules may be implemented in hardware, software, or a combination of hardware and software. The guarantor module generates a set of keys to be used in encrypting value-bearing documents. The guarantor module also generates a set of indices that correspond to the keys. The set of keys and the indices are communicated to the validator module to be used in validating value-bearing documents. The issuer module receives requests for value-bearing documents. The issuer module creates a value-bearing document including at least the start and stop valid dates. The issuer module forwards the document to the guarantor module along with an indication of the level of encryption desired. The guarantor may maintain a key space for each validator and for each encryption level within the key space for each validator. The guarantor module randomly or pseudo-randomly selects a key from the selected key space for each of the requests. The guarantor module encrypts each value-bearing document with the randomly or pseudo-randomly selected encryption key. The value-bearing document is then sent to the issuer. The issuer forwards the value-bearing document to the requester. The requester presents the value-bearing document, including the index, to the validator module. The validator module determines the key used to decrypt the document based on the index. The validator module then validates the document using the key.

Because the guarantor randomly or pseudo-randomly selects a key for each document, the compromising of a single key results only in the compromising of a small subset of documents. For example, in a ticket generation/validation system, the guarantor may use a set of 2000 keys to encrypt value or seating information for each of 2000 tickets in a 2000-seat arena. When the guarantor selects a key, each key has a 1/2000 chance of being selected. If one key is compromised, there is only a 1/2000 chance that any of the tickets can be decoded or copied.

According to another aspect, the present invention includes a unique message transmitted from a guarantor to an issuer and from a requester to a validator that carries an encrypted value-bearing document and information used to decrypt and validate the value-bearing document. One unique field in the message is an encryption scheme index field for storing indices used by the validator to identify the decryption key and/or scheme used to decrypt a value-bearing document. These indices used by the present invention to select keys and/or encryption schemes greatly increase the flexibility of a value-bearing document generation system. For example, the guarantor and the validator can agree on keys of different lengths or different encryption schemes and indices that correspond to the different keys or encryption schemes. The guarantor can then dynamically select a key length and/or encryption scheme based on the nature of the value-bearing document being requested.

Since the strength of an encryption system can depend on the length of an encryption key, it may be desirable to increase the key length in situations where increased security is desired and to decrease the key length in situation where computational efficiency is desired. For example, it may be desirable to select an n-bit key when encrypting the value information in a $10 gift certificate and to use an (n+x)-bit key when encrypting a $100 gift certificate. The unique messages used to communicate value-bearing documents between guarantors, issuers, and validators enable dynamic choice of encryption level, scheme, etc.

Accordingly, it is an object of the invention to provide methods and systems for validating documents where a key is randomly or pseudo-randomly selected to encrypt each document in a multi-document system.

It is another object of the invention to provide a message format suitable for communicating value-bearing documents between requesters, issuers, validators, and guarantors.

Some of the objects of the invention having been stated hereinabove, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings, of which.

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
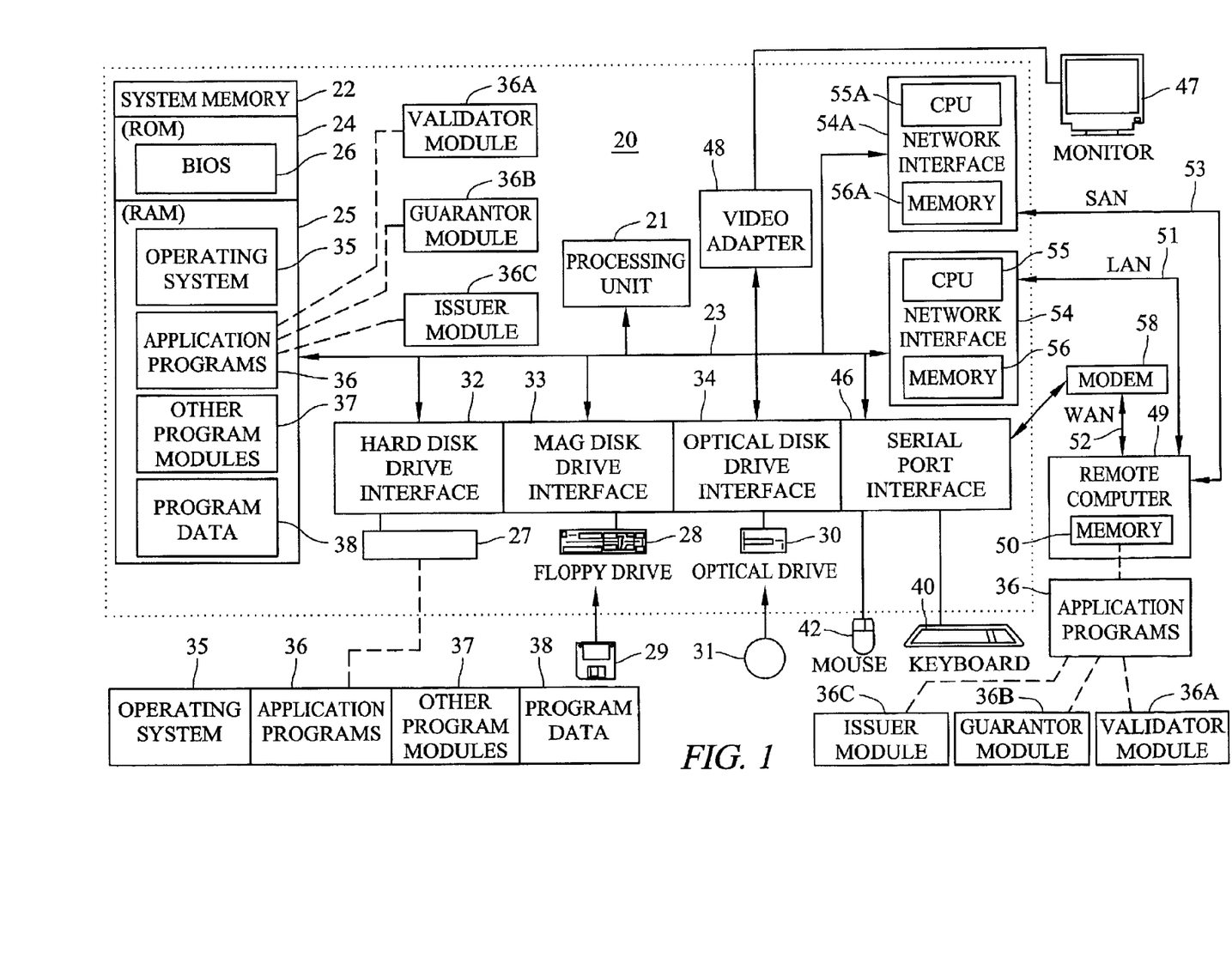
FIG. 1 is a block diagram of an exemplary operating environment for the methods and systems for generating and validating value-bearing documents according to embodiments of the present invention.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. System bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within personal computer 20, such as during start-up, is stored in ROM 24. Personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

Hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. Application programs that may be of particular interest to embodiments of the present invention include validator module 36A, guarantor module 36B, and issuer module 36C. In the illustrated embodiment, modules 36A–36C are shown as being stored in RAM 25. It is understood that these modules would also be stored in a long-term storage medium, such as the hard disk. Validator module 36A validates value-bearing documents received from a requester. Issuer module 36C issues value-bearing documents to a requester. Guarantor module 36B encodes value-bearing documents for secure delivery. Modules 36A–36C will be described in more detail below.

A user may enter commands and information into personal computer 20 through input devices such as a keyboard 40 and a pointing device 42. For example, the user may enter requests for value-bearing documents using keyboard 40 and pointing device 42. Other input devices (not shown) may include a microphone, touch panel, joystick, game pad, satellite dish, scanner, or the like. These and other input devices are often connected to processing unit 21 through a serial port interface 46 that is coupled to the system bus, but may be connected by other interfaces, such as a parallel port, game port or a universal serial bus (USB). A monitor 47 or other type of display device is also connected to system bus 23 via an interface, such as a video adapter 48. In addition to the monitor, personal computers typically include other peripheral output devices, not shown, such as speakers and printers. With regard to the present invention, the user may use one of the input devices to input data indicating the user's preference between alternatives presented to the user via monitor 47.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the personal computer 20, although only a memory storage device 50 has been illustrated in FIG. 1. In the illustrate example, remote computer 49 also includes modules 36A–36C for generating and validating value-bearing documents. The logical connections depicted in FIG. 1 include a local area network (LAN) 51, a wide area network (WAN) 52, and a system area network (SAN) 53. Local- and wide-area networking environments are commonplace in offices, enterprise-wide computer networks, intranets and the Internet.

System area networking environments are used to interconnect nodes within a distributed computing system, such as a cluster. For example, in the illustrated embodiment, personal computer 20 may comprise a first node in a cluster and remote computer 49 may comprise a second node in the cluster. In such an environment, it is preferable that personal computer 20 and remote computer 49 be under a common administrative domain. Thus, although computer 49 is labeled "remote", computer 49 may be in close physical proximity to the personal computer 20.

When used in a LAN or SAN networking environment, personal computer 20 is connected to local network 51 or system network 53 through network interface adapters 54 and 54A. Network interface adapters 54 and 54A may include processing units 55 and 55A and one or more memory units 56 and 56A.

When used in a WAN networking environment, personal computer 20 typically includes a modem 58 or other means for establishing communications over WAN 52. Modem 58, which may be internal or external, is connected to system bus 23 via serial port interface 46. In a networked environment, program modules depicted relative to personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer and/or the processing units of I/O devices of electrical signals representing data in a structured form. This manipulation transforms the data or maintains it at locations in the memory system of the computer and/or the memory systems of I/O devices, which reconfigures or otherwise alters the operation of the computer and/or the I/O devices in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that the acts and operations described hereinafter may also be implemented in hardware.

Figure 2:
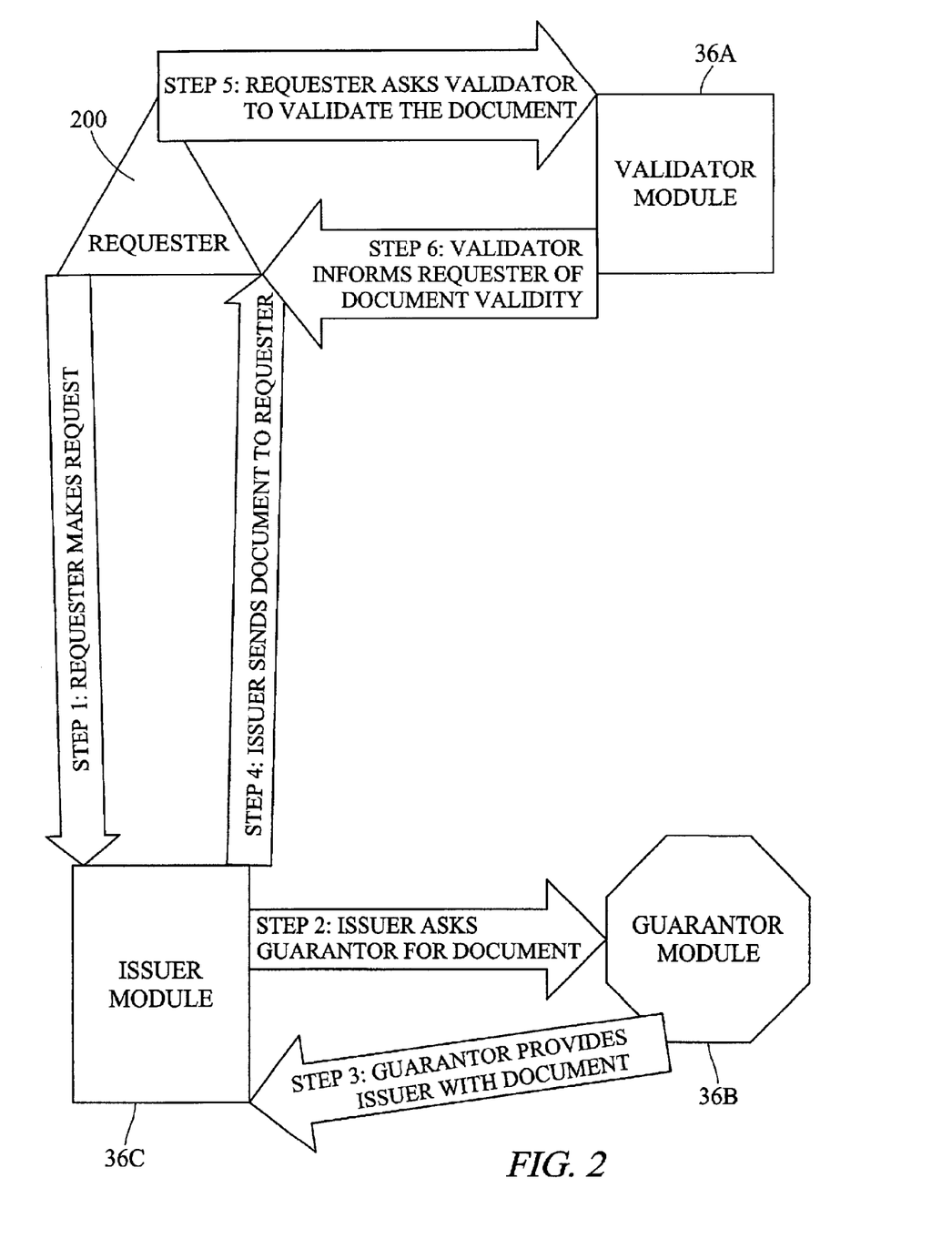
FIG. 2 is a message flow diagram illustrating a method and a system for generating and validating a value-bearing document according to an embodiment of the present invention.

FIG. 2 is a message flow diagram illustrating a method and a system for generating and validating documents according to an embodiment of the present invention. The communicating entities in FIG. 2 include the guarantor and issuer modules 36A–36C described above with respect to FIG. 1. In addition, a requester 200 communicates with issuer module 36C to obtain a value-bearing document and with validator module 36A to validate the value-bearing document. Requester 200 may be a computer or an end user who accesses modules 36A–36C using a computer. It is understood that modules 36A–36C may be located on the same computer or on different computers connected via local or wide area networks.

In step 1, requester 200 requests a value-bearing document from issuer module 36C. If requester 200 has access to the computer on which issuer module 36C is located, requester 200 may simply access a local user interface, such as a graphical user interface or a command line interface. If requester 200 is located remotely from issuer module 36C, requester 200 may access issuer module 36C using a web browser, such as Microsoft INTERNET EXPLORER® or Netscape NAVIGATOR®. The present invention is not limited to any particular device for transmitting the request. For example, the request may be transmitted using a personal computer, a handheld computer, a telephone, such as a mobile telephone, a landline telephone, or a wireless access protocol (WAP) phone, or any other device capable of receiving information from a requester and transmitting the information to issuer module 36C. The requester can also be a computer program.

In response to receiving the request for the value-bearing document, in step 2, issuer module 36C generates a value-bearing document and sends a request to guarantor module 36B for an encrypted value-bearing document. The request from issuer module 36C may include information received from the requester, value information, and other information required for value-bearing document validation. For example, if the value-bearing document is a gift certificate, the value information, but not necessarily the requester's identity is needed. For a building permit, the requester's identity and address is needed. The request may also include a requested security level, e.g., based on the value of the document being requested. Allowing issuer module 36C to request a security level on a per-document basis greatly increases the flexibility of the methods and systems for validating documents according the present invention over conventional document validation systems. The request from the issuer may also indicate a target validator for validating the encrypted value-bearing document. The request is preferably communicated to guarantor module 36B over a secure communication channel, such as a secure sockets layer (SSL) connection.

Issuer module 36C may charge requester 200 for the document, for example by obtaining and processing the requester's credit card information. Any secure method for charging the requester's credit card may be used to obtain value from requester 200. For example, secure electronic transaction (SET) may be used to charge the requester and obtain payment from the credit card issuer.

In step 3, guarantor module 36B receives the request from issuer module 36C, generates a message containing the encrypted value-bearing document, and forwards the message to issuer module 36C. In addition to the encrypted value-bearing document, the message preferably also contains an index indicating to the target validator as to how to decrypt the value-bearing document. The structure of this message will be discussed in more detail below.

Figure 3:
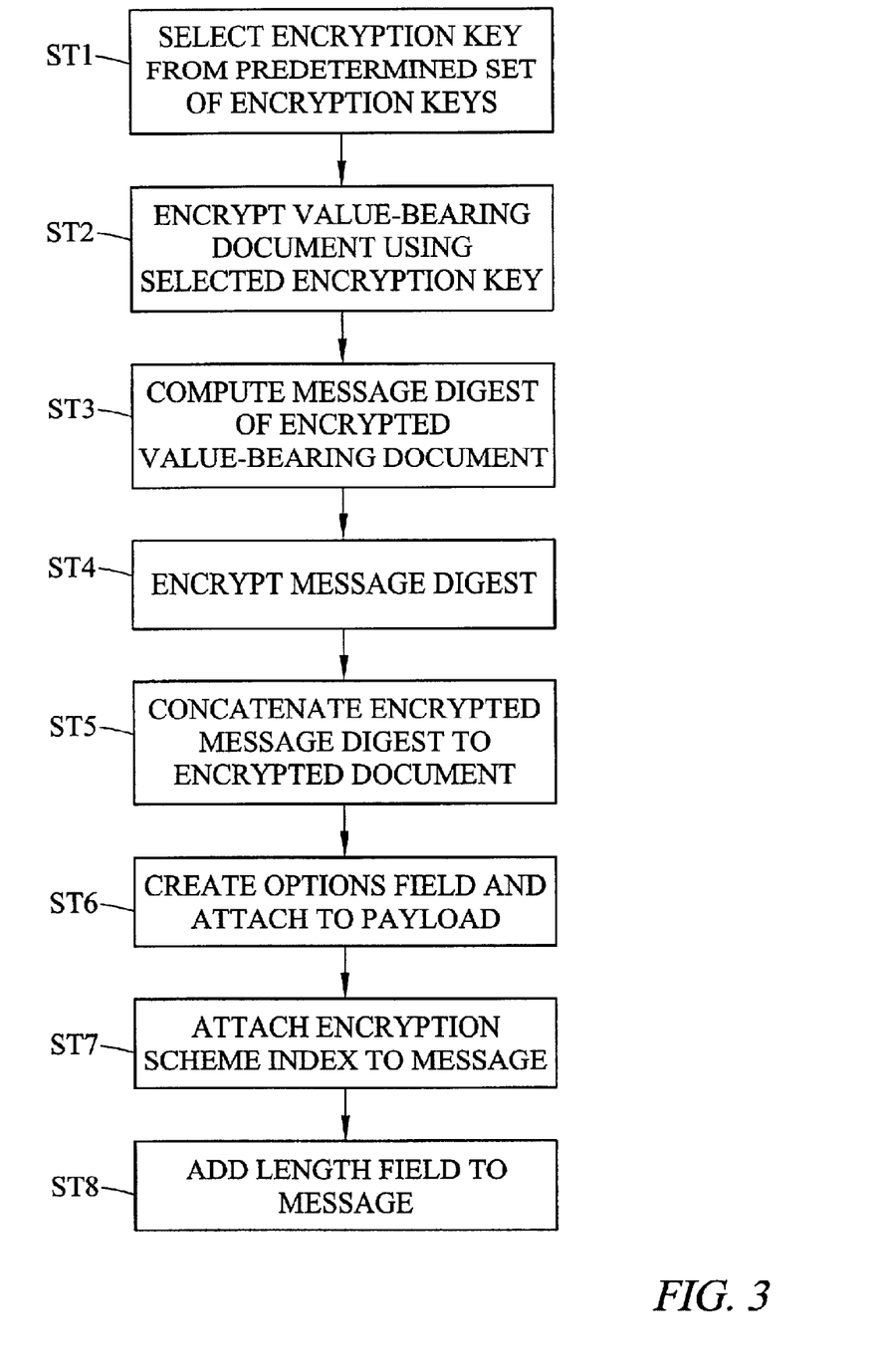
FIG. 3 is a flow chart illustrating exemplary steps performed by a guarantor module in generating a dynamic transaction protocol message including a value-bearing document according to an embodiment of the present invention.

FIG. 3 illustrates exemplary steps performed by guarantor module 36B in generating the message containing the encrypted value-bearing document. According to an important aspect of the invention, in a multi-value-bearing document system, such as a ticket generation/validation system, in step ST1, guarantor module 36B selects a key from a predetermined set of keys for the system encrypting each value-bearing document. In a preferred embodiment of the invention, guarantor module 36B maintains a key space for each validator, as well as a general-purpose key space. The key space for each validator may be divided into sub-spaces for security levels requested by the document issuer. For example, a document issuer may require security levels of no encryption, low encryption, medium encryption, and high encryption, depending on the value or the nature of the particular documents being validated. The corresponding key spaces at guarantor module 36B may each contain keys having a length that corresponds to the requested security level. Issuer module 36C may include the requested encryption level in the request sent to guarantor module 36B. Issuer module 36C or guarantor module 36B may determine the target validator for the particular issuer. Guarantor module 36B then determines the key space for that validator. Next, guarantor module 36B determines the sub-space within the key space for the particular validator. Finally, once the key space has been selected, guarantor module 36B may perform a random or pseudo-random selection within the key space. Randomly or pseudo-randomly selecting an encryption scheme or key for each document in a multi-document system greatly enhances the security of the system without additional computational burden on guarantor module 36B or validator module 36A. For example, in a key space having n keys, if a single key is compromised, there is only a 1/n probability that it will be useful to decrypt any of the documents. Conventional value-bearing document distribution systems that rely on a single key or key pair must use strong encryption because if the single key is compromised, all of the documents encrypted using that key are compromised. In contrast, the methods and systems for generating and validating value-bearing document according to embodiments of the present invention can use weaker encryption algorithms or shorter keys because the loss of a single key has a reduced effect on the system. As a result, computational complexity is reduced.

Maintaining separate key spaces for each validator also enhances security. For example, if a key space for one validator is compromised, the key space for another validator is not affected. Maintaining separate sub-spaces within the key space for each validator adds both security and flexibility. With regard to security, if one sub-space is compromised, the other sub-spaces will not be affected. With regard to flexibility, the sub-spaces allow issuers to select an encryption level that corresponds to the value or nature of the document being generated and validated.

Once the key is selected, in step ST2, guarantor module 26B uses the selected key to encrypt the value-bearing document. Any suitable encryption algorithm may be used to encrypt the document. For example, symmetric cryptographic algorithms, such as the data encryption standard (DES) may be used. Alternatively, asymmetric cryptographic algorithms, such as Rivest, Shamir, Adleman (RSA) may be used.

In order to guarantee the integrity of the document, in step ST3, guarantor module 36B preferably computes a hash or message digest of the encrypted value-bearing document before sending the document to issuer module 36C. Any suitable hash algorithm may be used. In a preferred embodiment of the present invention, the MD5 hash algorithm is used to compute the hash of the encrypted value-bearing document. Since sending the hash of a message attached to the message is not secure, in step ST4, guarantor module 36B preferably encrypts the hash before sending the message to issuer module 36C. The hashed message may be encrypted or digitally signed using the guarantor module's private key. Other entities, such as validator module 36A, can obtain the guarantor's public key, e.g., from a certificate authority after authentication, and verify the guarantor's signature.

Once the message digest is calculated and encrypted, in step ST5, guarantor module 36B concatenates the message digest to the encrypted value-bearing document. Hereinafter, the encrypted value-bearing document and the encrypted message digest will be referred to as the payload. Once the payload has been created, in step ST6, guarantor module 36B creates an options field and attaches the options field to the payload. The options field can be used to carry any information desired by guarantor module 36B.

Once the options field has been created and filled (or left blank), in step ST7, guarantor module 36B attaches the encryption scheme index to the message. The encryption scheme index informs validator module 36A of the particular encryption scheme and/or key used to encrypt the message. For example, guarantor module 36B and validator module 36A may each maintain a database of encryption scheme indices and corresponding keys and encryption schemes. Table 1 shown below illustrates an example of the format of such a database for the guarantor: Table 2 shown below illustrates an example of the format of such a database for the validator:

TABLE 1

Encryption Scheme Indices and Corresponding Keys for Guarantor

| Encryption Scheme Index | Encryption Algorithm | Encryption Key | Level |
|---|---|---|---|
| 00000000 | plaintext | none | 0 |
| 00000001 | DES | 96F345QY4G8MA60YB | 1 |
| ... | ... | ... | |
| FFFFFFFF | RSA | FF2314REZ2V81NM9 | 5 |

TABLE 2

Encryption Scheme Indices and Corresponding Keys for Validator

| Encryption Scheme Index | Encryption Algorithm | Decryption Key |
|---|---|---|
| 00000000 | plaintext | none |
| 00000001 | DES | 96F345QY4G8MA60YB |
| ... | ... | ... |
| FFFFFFFF | RSA | XY56TY6457HVQWER |

The encryption scheme indices and corresponding keys illustrated in Table 1 may be exchanged between guarantor module 36B and validator module 36A off line before starting to encrypt value-bearing documents. Encryption keys may be generated using any standard key generation tool, such as keytool in the JAVA® Development Kit available from SUN Microsystems.

Figure 4:
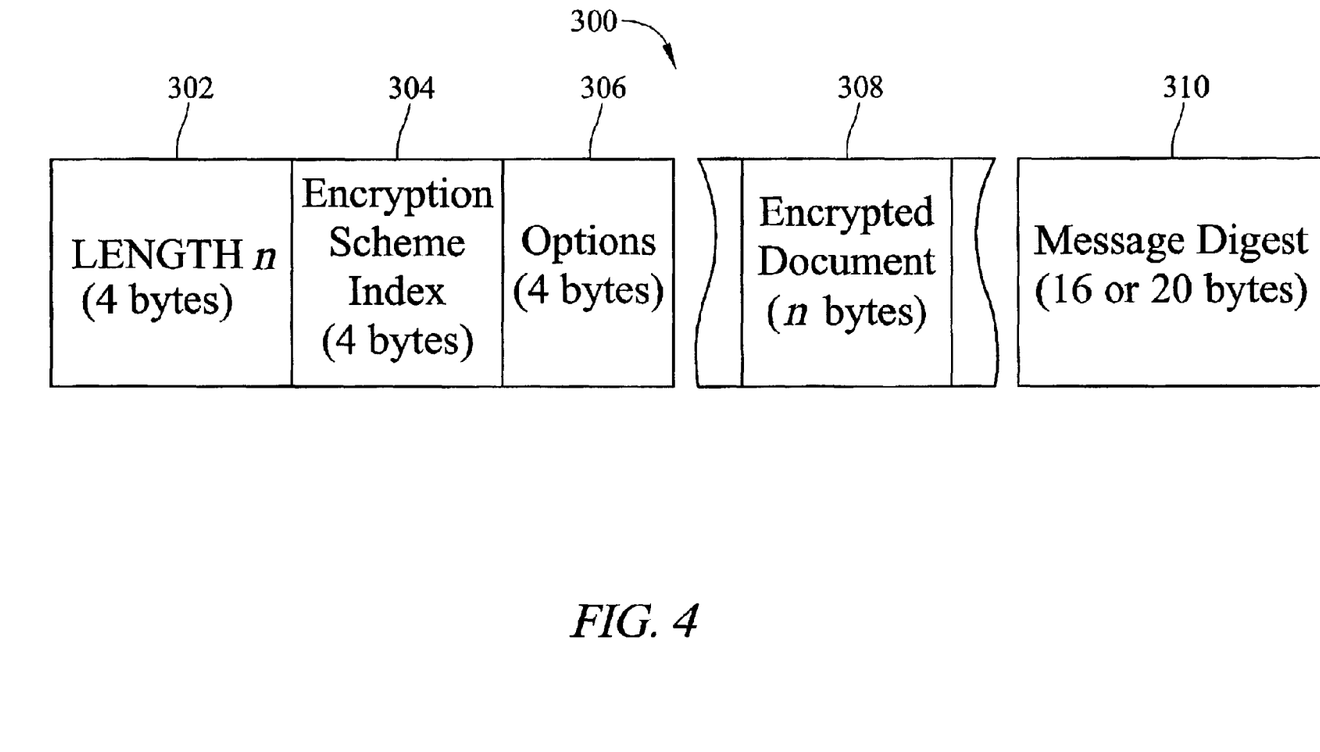
FIG. 4 is a block diagram of a dynamic transaction protocol message used to carry value-bearing documents according to an embodiment of the present invention.

Once the encryption scheme index has been added to the message, in step ST8, guarantor module 36B adds a length field to the message. The length field indicates the length of the encrypted message. This value is used by validator module 36A to retrieve and parse the message. FIG. 4 illustrates an example of a dynamic transaction protocol message generated by guarantor module 36B and used to carry an encrypted value-bearing document to issuer module 36C according to an embodiment of the present invention. In the illustrated embodiment, a dynamic transaction protocol message 300 includes a length field 302 for storing the length of the message, an encryption scheme index field 304 for storing the index value used to indicate which key, key pair, and/or encryption scheme should be used to decrypt the message, an options field 306 that is reserved for future use, an encrypted document field 308 for storing the encrypted value-bearing document, and a message digest field 310 for storing the encrypted digest of the message. Once guarantor module 36B has constructed dynamic transaction protocol message 300, guarantor module 36B may convert the message to ASCII format. Conversion to ASCII format may be required in instances in which the value-bearing document is transmitted to the requester in printed format. Conversion to ASCII format may also be required when the encrypted value-bearing document is transmitted to the requester in bar code format. For example, the message may also be converted into bar code format, such as PDF417 format, either by guarantor module 36B or issuer module 36C. Converting the message into bar code format expedites validation by validator module 36A. For example if the message includes an encrypted ticket, validator module 36A may be coupled to a bar code reader that reads the encoded document and communicates the encoded information to validator module 36A for validation.

Referring back to FIG. 2, once the issuer module receives the message containing the encrypted value-bearing document, in step 4, issuer module 36C forwards the message to requester 200. Forwarding the message to requester 200 can occur over any suitable medium, e.g., in electronic format over a computer network or in paper format via a courier. In step 5, requester 200 presents the message to validator module 36A for validation. In step 6, validator module 36A validates the message.

Figure 5A:
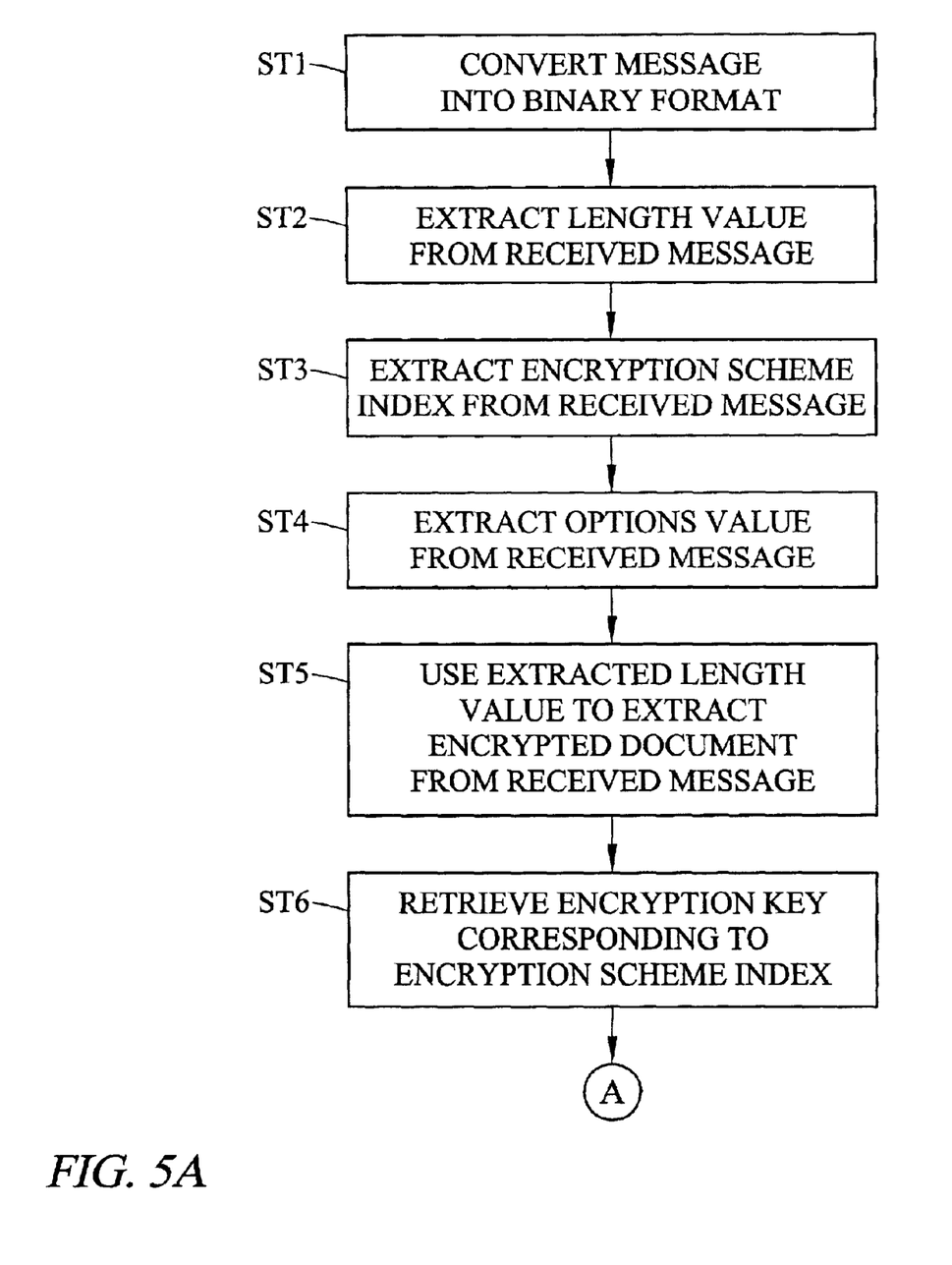
FIGS. 5A and 5B are a flow chart illustrating exemplary steps performed by a validator module or a guarantor module in validating a received dynamic transaction protocol message according to an embodiment of the present invention.

FIGS. 5A and 5B are a flow chart illustrating exemplary steps performed by validator module 36A in validating a message. Referring to FIG. 5A, in step ST1, validator module 36A converts the received message into binary format. This step may be required when the message is presented to validator module 36A in non-binary format, such as ASCII format. If the message is presented in binary format, step ST1 may be omitted. In step ST2, validator module 36A extracts the length value from the received message. The length value may be stored for later use. In step ST3 validator module 36A, extracts the encryption scheme index from the message. The encryption scheme index may be stored for later use in extracting an encryption key from the encryption key database. In step ST4, validator module 36A extracts the options value from the received message. The options value may be used for any purpose agreed upon by validator module 36A and guarantor module 36B. In step ST5, validator module 36A, uses the extracted length value to extract the encrypted document from the received message. In step ST6, validator module 36A retrieves the encryption key corresponding to the encryption scheme index extracted from the received message in step ST7.

Figure 5B:
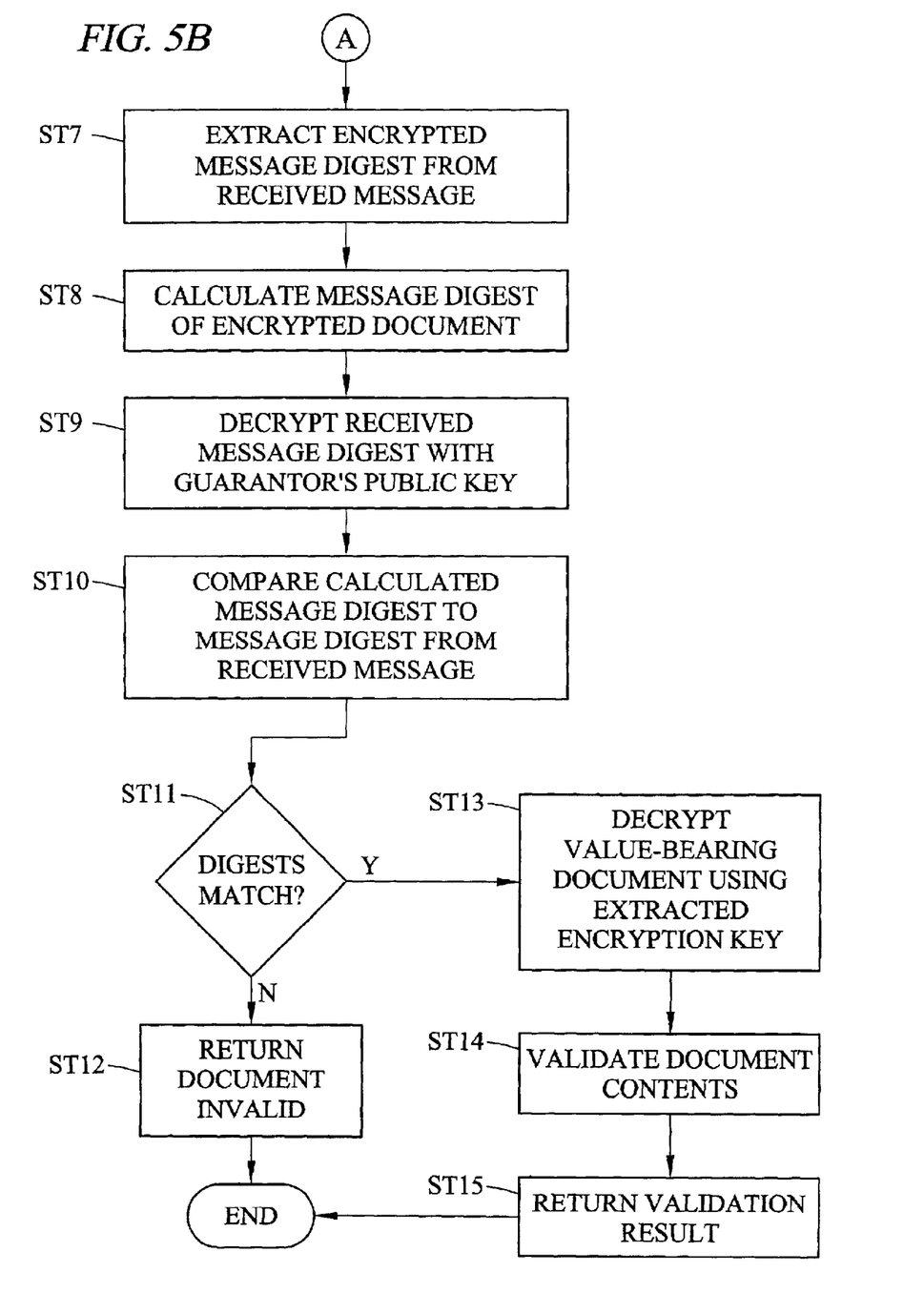

Referring to FIG. 5B, in step ST8, validator module 36A extracts the encrypted message digest from the received message. In step ST9, validator module 36A calculates the message digest of the encrypted document extracted from the received message. In step ST10, validator module 36A decrypts the message digest extracted from the received message using the guarantor's public key. In steps ST11 and ST12, validator module 36A compares the calculated message digest to the received message digest. If the message digests match, in step ST13, validator module 36A proceeds to step ST14 where the message is decrypted using the key extracted from the database.

In step ST15, validator module 36A validates the document contents. The steps performed in validating the document contents depend on the type of document being validated. For example, if the document is a ticket, once the document is decrypted, the section number, row number, seat number, and event code may be read from the document. These values may be checked to determine whether the specified section, row, seat, and event actually exist in the event venue and whether or not the ticket is a duplicate of a previously validated ticket. As another validation example, if the document is a voucher or a gift certificate, validation may include reading value information and a code that uniquely identifies the voucher in order to check for duplicates. In step ST16, validation results are returned.

Document validation may also include verifying that the document is within valid start and end dates. For example, when issuer module 36C creates the value-bearing document, the issuer module may include a valid start date and a valid end date that define a range during which the document can be validated. Guarantor module 36B may include this information in the encrypted value-bearing document. Storing the start and end dates in the encrypted portion of the message is preferred for security reasons. Otherwise, the bearer of the document would be able to modify the range of dates and increase the range of dates during which the document could be validated. When validator module 36A decrypts the value-bearing document, validator module 36A may verify that the current date is within the valid start and end dates. If the current date is within the start and end dates, validator module 36A may proceed with validating the remaining fields, as discussed above. If the current date is not within the start and end dates, validator module 36A may reject the document.

Returning to FIG. 2, once validation has occurred, in step 6, validator module 36A indicates to requester 200 whether or not the document was valid. If the requester is physically present at the validation site, the validation result may be displayed to the requester on a computer screen. If the requester is not present at the validation site, the validation result may be encapsulated in a network packet and transmitted to the requester over a computer network.

Figure 6:
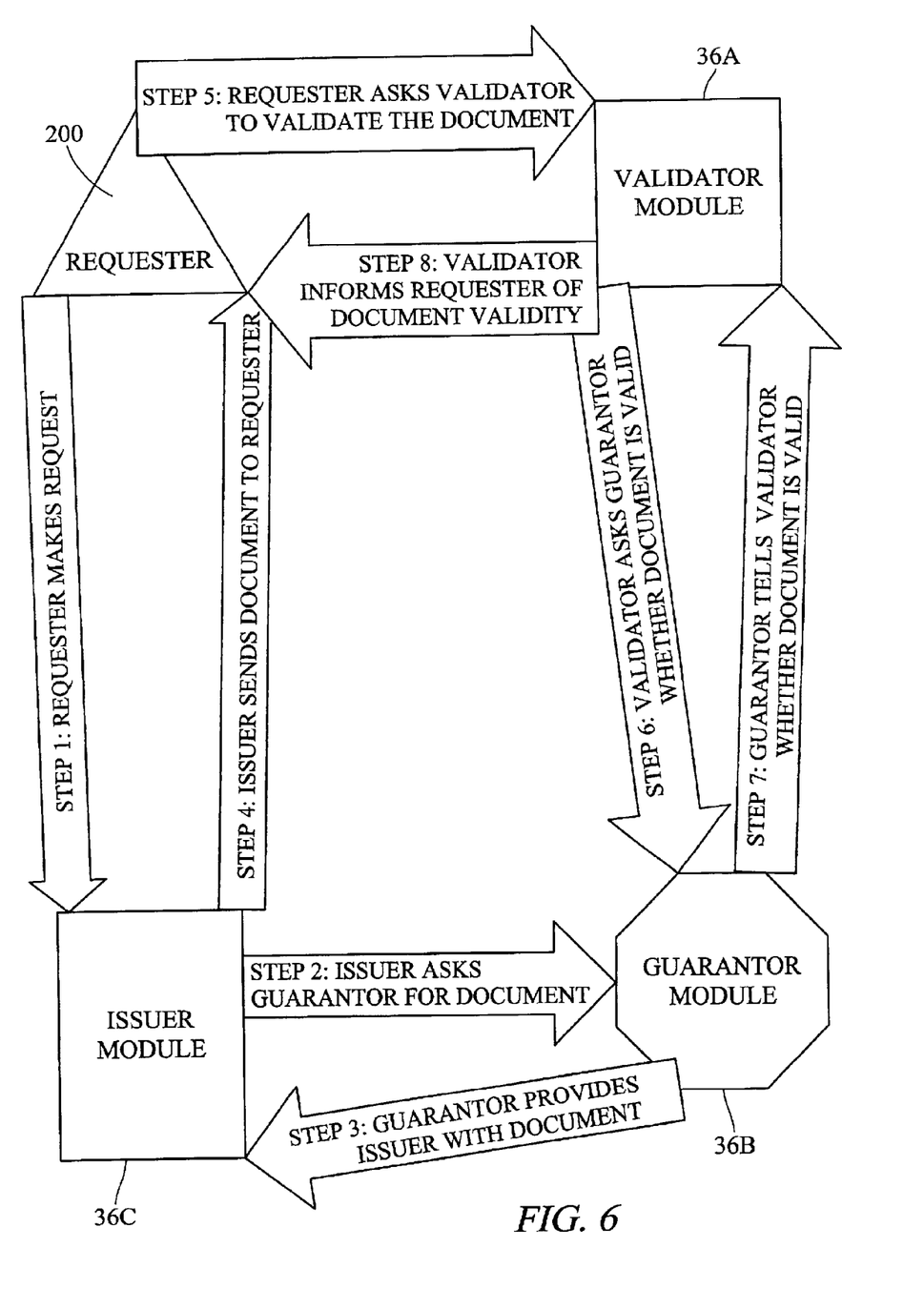
FIG. 6 is a flow chart illustrating a method and a system for generating and validating value-bearing documents according to an alternate embodiment of the present invention.

The present invention is not limited to having all validation steps performed by validator module 36A. For example, in an alternate embodiment of the invention, validation may be performed by guarantor 36B. FIG. 6 is a message flow diagram similar to FIG. 2 where validation steps are performed by guarantor module 36B, rather than validator module 36A. The communicating entities in FIG. 6 are the same as those described above with respect to FIG. 2. Hence, a description thereof will not be repeated herein. Similarly, the messages transmitted between requester 200 and issuer module 36C, between issuer module 36C and guarantor module 36B, and between requester 200 and validator module 36A are the same as those described with respect to FIG. 2. The additional messages added in the flow diagram in FIG. 6 are steps 6 and 7, where validator module 36A requests and receives validation from guarantor module 36B. Guarantor module 36B performs the validation steps described above with respect to FIG. 5. Thus, FIG. 6 illustrates an embodiment of the invention where guarantor module 36B, rather than validator module 36A, performs document validation.

Figure 7:
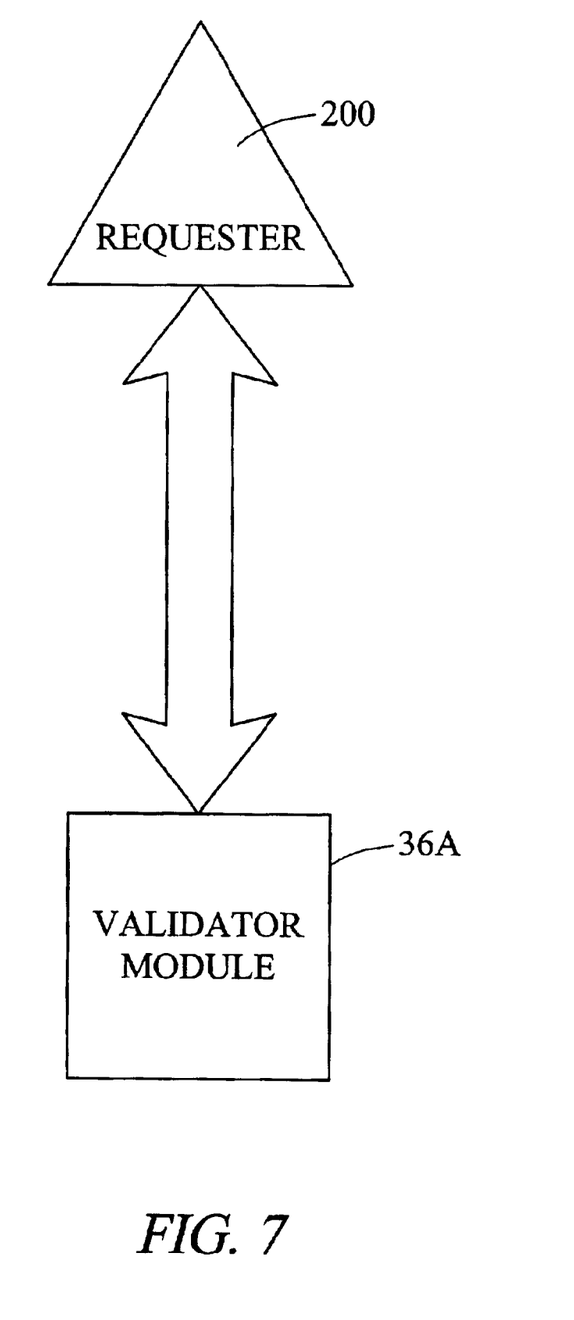
FIG. 7 is a block diagram illustrating a value-bearing document validation system including a stand-alone validator module according to an embodiment of the present invention.

Validator module 36A may be a stand-alone unit that communicates directly with requester 200 in order to validate documents presented at a single location. Alternatively, validator module 36A may be a centralized unit adapted to validate documents presented for validation at a variety of different locations. In either case, validator module 36A may validate documents for a single event or purpose or for a plurality of different events or purposes. FIG. 7 illustrates an example of a stand-alone validator module according to an embodiment of the present invention. In FIG. 7, stand-alone validator module 36A communicates directly with requester 200 to validate documents presented at a single location. For example, validator module 36A may be a ticket validator located at an event venue to validate tickets as ticket holders enter the venue.

Figure 8:
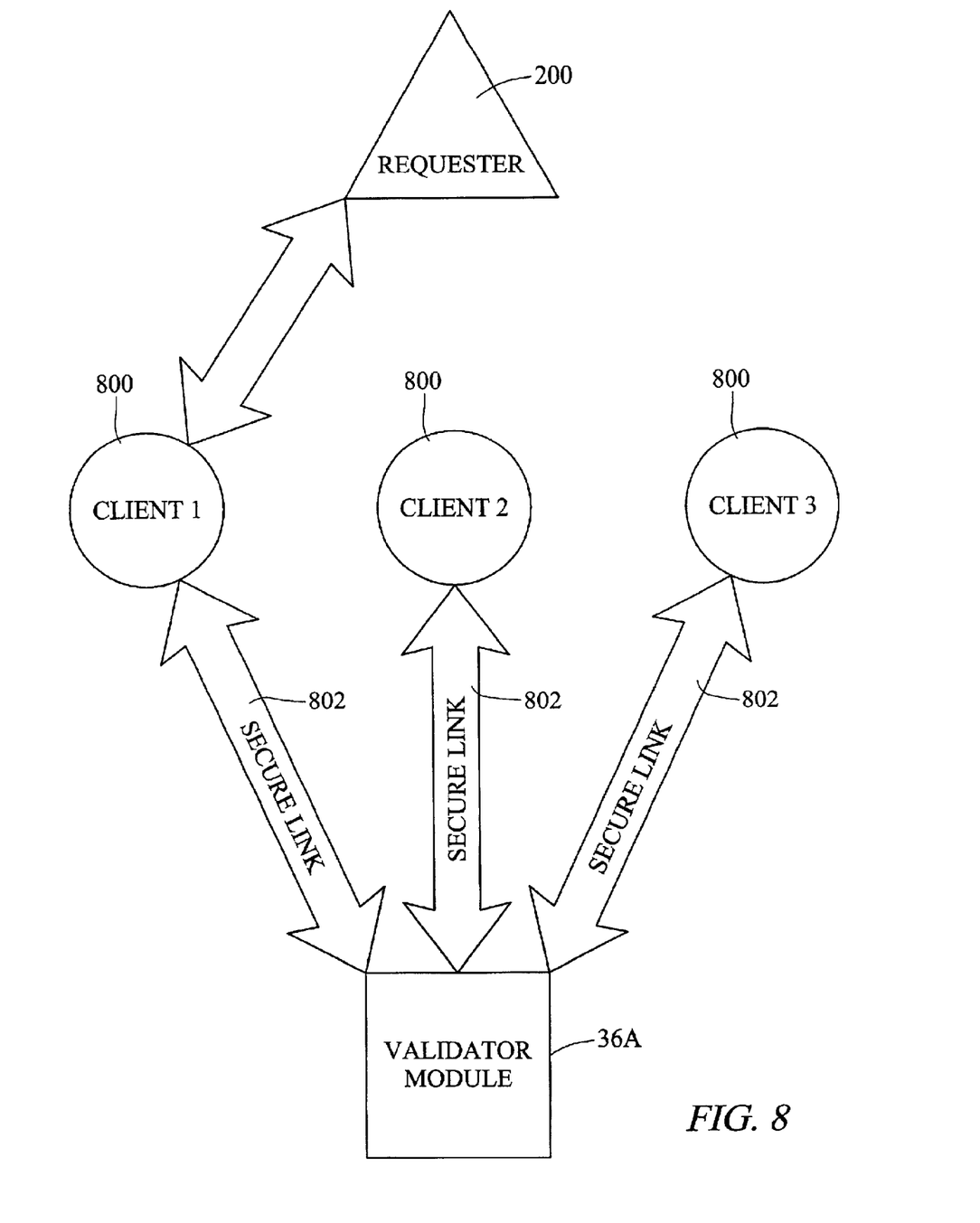
FIG. 8 is a block diagram illustrating a value-bearing document validation system including a centralized validator module according to an embodiment of the present invention.

FIG. 8 illustrates a centralized validator according to an embodiment of the present invention. In FIG. 8, validator module 36A comprises a general-purpose validator capable of validating documents presented at multiple locations and/or for multiple events/purposes. Validation clients 800 receive validation requests from requesters 200 and request validation from centralized validation module 36A. Clients 800 may be computers or any other similar device located at validation sites, such as different event venues or different entrances in a single event venue. Validation clients 800 may be connected to validator module 36A via secure communication links 802. Secure communication links 802 may be any suitable secure communication links, such as SSL connections. Validator module 36A receives and processes the validation requests from clients 800 in the same manner described above for a single validation client. Thus, the present invention includes both stand-alone and centralized validator modules for validating value-bearing documents.

The methods and systems for generating and validating value-bearing documents may be varied or modified in accordance with the type of value-bearing documents being generated and validated. Table 3 shown below contains exemplary system variations for the present invention. In Table 3, the first column refers to whether there is a live network connection between guarantor module 36B and validator module 36C. The second column indicates whether or not the target validator is known, and the third column indicates whether the number of times a given document can be validated is limited.

TABLE 3

System Variations

| Connection Between Validator and Guarantor? | Target Validator Known or Unknown? | Number of Validations Limited or Unlimited? |
| --- | --- | --- |
| No Connection | Known | Limited |
| Live Connection | Unknown | Limited |
| No Connection | Known | Unlimited |
| Live Connection | Known | Unlimited |
| No Connection | Unknown | Unlimited |
| Live Connection | Unknown | Unlimited |

The system variations illustrated in Table 3 can be paired with one or more of the document types described above. For example, a system where there is no connection between the validator and the guarantor, the target validator is known, and the number of validations is limited may be used in validating gift certificates, tickets, and debit items. Such items are usually only validated once. Such a system requires both encryption and authentication to ensure document validity.

A system in which there is a live connection between the guarantor and the validator, the target validator is unknown, and there are a limited number of validations per document may be used with the same type of documents as in the previously described example in which the transmission medium is not reliable. The transmission medium refers to the medium for communicating the encrypted value-bearing document from the document issuer to the validator. An example of an unreliable transmission medium is when the encrypted value-bearing document is a bar code printed by the requester's ink jet printer. Since such a bar code may smear or become otherwise unreadable, it may be desirable to have a live or backup connection between the guarantor and the validator. Such a backup connection may be a computer network connection or a telephone connection. The connection may be used to communicate other information printed on the face of the value-bearing document, such as a serial number, to the guarantor, in the event that the bar code is unreadable.

A system in which there is no connection between the validator and the guarantor, the target validator is known, and the number of validations is unlimited may be used for validating legal documents, such as wills or other documents that require authentication.

A system in which there is a live connection between the validator and the guarantor, the target validator is known, and the number of validations is unlimited may be for validating the same types of documents described in the previous example when the transmission medium is unreliable.

A system in which there is no connection between the validator and the guarantor, the target validator is unknown, and the number of validations is unlimited may be used for validating building permits.

A system in which there is a live connection between the validator and the guarantor, the target validator is unknown, and the number of validations is unlimited may be used for validating the same types of documents as in the previous example step where the transmission medium is unreliable.

An example in which the embodiments of the present invention described above can be used is for issuing and validating financial documents, such as money, checks, or wire transfers. For example, a requester may wish to send money to a relative in a remote location. The requester may request a value-bearing document from an issuer terminal, e.g. using a credit card. The value-bearing document will then be generated and encrypted in the manner described above. The requester may then send the encrypted value-bearing document to the desired recipient, e.g. using email. The intended recipient may then present the encrypted value-bearing document to a validator, such as a business, bank, or government agency and obtain payment. This method may be used instead of a wire transfer to send money to remote locations.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for generating and validating value-bearing documents comprising:

(a) receiving a plurality of requests for generating a plurality of value-bearing documents;

(b) generating the value-bearing documents;

(c) maintaining a key space including a plurality of different encryption keys for encrypting the value-bearing documents;

(d) for each of the value-bearing documents:

(i) randomly or pseudo-randomly selecting an encryption key from the key space and encrypting at least a portion of the information contained in the value-bearing document using the selected encryption key;

(ii) generating a message including the encrypted portion and an index indicative of the encryption key used to encrypt the portion and forwarding the message to the requester; and (iii) receiving the message and validating the value-bearing document using the index.

2. The method of claim 1 wherein receiving a plurality of requests for generating a plurality of value-bearing documents includes receiving requests for generating tickets and wherein generating the value-bearing documents includes generating the tickets.

3. The method of claim 1 wherein receiving a plurality of requests for generating a plurality of value-bearing documents includes receiving requests for generating financial documents and wherein generating the value-bearing documents includes generating the financial documents.

4. The method of claim 1 wherein receiving a plurality of requests for generating a plurality of value-bearing documents includes receiving requests for generating gift certificates and wherein generating the value-bearing documents includes generating the gift certificates.

5. The method of claim 1 wherein maintaining a key space includes maintaining a key space specific to a validator and maintaining different key spaces for different validators.

6. The method of claim 5 wherein selecting an encryption key from the key space includes selecting the encryption key from a sub-space within the validator-specific key space corresponding to a security level requested by an issuer of the value-bearing document.

7. The method of claim 1 wherein validating the document using the index includes extracting a decryption key from a database using the index and decrypting the value-bearing using the extracted decryption key.

8. The method of claim 1 wherein receiving the message includes receiving the message from the requester.

9. The method of claim 1 wherein receiving the message includes receiving the message from a third party that obtained the message from the requester.

10. A method for generating and validating value-bearing documents comprising:
   (a) receiving, from a requester, a request for a value-bearing document;
   (b) generating the value-bearing document;
   (c) selecting an encryption key from a predetermined key space and encrypting at least a portion of the information contained in the value-bearing document using the selected encryption key;
   (d) generating a message including the encrypted portion and an index indicative of the encryption key used to encrypt the portion and forwarding the message to the requester, wherein generating a message includes generating a message having a length field for indicating the length of the encrypted portion, a encryption scheme index field for storing the index, an encrypted message field for storing the encrypted portion, and an encrypted message digest field for storing a message digest of the encrypted portion; and
   (e) receiving the message and validating the value-bearing document using the index.

11. A method for generating documents to be validated in a multi-document generation/validation system, the method comprising:
   (a) generating a set of n encryption keys, n being an integer greater than one;
   (b) assigning an index to each of the n encryption keys;
   (c) communicating the indices and the encryption keys to a document validator in the multi-document generation/validation system;
   (d) receiving requests from issuers for encrypted value-bearing documents; and
   (e) for each request, randomly or pseudo-randomly selecting one of the encryption keys, encrypting a value-bearing document using the selected encryption key, and communicating the encrypted value-bearing document and the index to the issuer.

12. The method of claim 11 wherein receiving requests for encrypted value-bearing documents includes receiving requests for encrypting tickets.

13. The method of claim 11 wherein receiving requests for encrypted value-bearing documents includes receiving requests for encrypting financial documents.

14. The method of claim 13 comprising converting the messages into bar code format and forwarding the bar-code-formatted messages to the requesters.

15. The method of claim 11 wherein receiving requests for encrypted value-bearing documents includes receiving requests for encrypting gift certificates.

16. The method of claim 11 wherein communicating the encrypted value-bearing documents to the issuer includes generating messages, each message including a length field for storing the length of the encrypted value-bearing document, an encryption scheme field for storing the index corresponding to the encryption key for each document, and an encrypted message digest field for storing an encrypted message digest of the encrypted value-bearing document and forwarding the messages to the issuer.

17. The method of claim 11 comprising receiving the encrypted value-bearing documents from requesters and validating the encrypted value-bearing documents using the indices and the corresponding encryption keys.

18. The method of claim 11 wherein randomly or pseudo-randomly selecting one of the encryption keys comprises selecting one of the encryption keys from a sub-space within a validator-specific key space corresponding to a document-issuer-specified encryption level.

19. A method for generating a secure value-bearing documents comprising:
   (a) receiving, from a document issuer, a request for generating an encrypted value-bearing document, the request including information to be included in the encrypted value-bearing document, a desired security level, a date and time when the document begins to be valid, and a date and time when the document ceases to be valid;
   (b) randomly or pseudo-randomly selecting an encryption key from a sub-space within a validator-specific key space corresponding to the requested security level;
   (c) encrypting the value-bearing document using the selected encryption key; and
   (d) communicating the encrypted value-bearing document to a document requester.

20. A document validation system comprising:
   (a) an issuer module for receiving requests from end users for value-bearing documents;
   (b) a guarantor module for receiving the requests from the issuer module, for generating encrypted value-bearing documents based on the requests, wherein generating the encrypted value-bearing documents includes randomly or pseudo-randomly selecting an encryption key from a predetermined set of n keys, n being an integer greater than one, encrypting each of the value-bearing documents using one of the randomly or pseudo-randomly selected encryption keys, and forwarding the encrypted value-bearing documents and an index for decoding each of the value-bearing-documents to the issuer module, wherein the issuer module forwards the encrypted value-bearing documents to the requesters; and
   (c) a validator module for receiving the encrypted value-bearing documents and the indices from the requesters, for selected decryption keys for decrypting the documents based on the indices and for validating the documents using the selected decryption keys.

21. The system of claim 20 wherein the value-bearing documents comprise tickets.

22. The system of claim 20 wherein the value-bearing documents comprise financial documents.

23. The system of claim 20 wherein the value-bearing documents comprise gift certificates.

24. The system of claim 20 wherein the issuer module is adapted to generate bar codes containing the encrypted value-bearing information and to forward the bar codes to the requesters.

25. The system of claim 20 wherein the issuer module is adapted to request a security level from the guarantor module, and wherein the guarantor module is adapted to select the encryption key from a key space based on the requested security level.

26. The system of claim 25 wherein the issuer module is adapted to request a target validator from the guarantor module and the guarantor module is adapted to select the encryption key from a key space based on the target validator.

27. The system of claim 20 wherein the guarantor module is adapted to generate bar codes containing the encrypted value-bearing documents and to forward the bar codes to the issuer module.

28. The system of claim 20 wherein the guarantor module is adapted to generate messages containing the encrypted value-bearing documents, each message including a length field for storing the length of the encrypted value-bearing document, an encryption scheme field for storing the index, an encrypted message field for storing the encrypted value-bearing document, and a message digest field for storing an encrypted message digest of the encrypted value-bearing document.

29. The system of claim 28 wherein the guarantor module is adapted to generate message digests of each encrypted value-bearing document, encrypt the message digests, and store encrypted message digest values in the message digest fields.

30. The system of claim 29 wherein the validator module is adapted to validate each of the messages by decrypting the encrypted value-bearing documents and the message digests, computing the message digests of the encrypted value-bearing documents, and comparing the computed message digests to the decrypted message digests to verify the integrity of the received value-bearing documents.

31. The system of claim 20 wherein the validator module comprises a stand-alone unit adapted to validate value-bearing documents presented at a single location.

32. The system of claim 20 wherein the validator module comprises a centralized unit adapted to validate value-bearing documents presented at a plurality of different locations.

33. A computer program product comprising computer-executable instructions embodied in a computer-readable medium for performing steps comprising:

(a) receiving requests for encrypted value-bearing documents;

(b) for each request, selecting an encryption key from a predetermined set of n encryption keys, n being an integer greater than one;

(c) for each request, encrypting a value-bearing document using one of the selected encryption keys;

(d) generating messages for communicating the encrypted value-bearing documents to document requesters, each message including an encryption scheme index for identifying a key for decrypting a value-bearing document; and (e) forwarding the messages to the document requesters.

34. The computer program product of claim 33 wherein receiving requests for encrypted value-bearing documents includes receiving a request for encrypting a ticket.

35. The computer program product of claim 33 wherein receiving requests for encrypted value-bearing documents includes receiving a request for encrypting a financial document.

36. The computer program product of claim 33 wherein receiving requests for encrypted value-bearing documents includes receiving a request for encrypting a gift certificate.

37. The computer program product of claim 33 wherein receiving requests for encrypted value-bearing documents includes receiving a request including a specified encryption level and wherein selecting an encryption key for each request includes selecting an encryption key based on the specified encryption level.

38. The computer program product of claim 33 wherein selecting an encryption key for each request includes dynamically selecting an encryption key length based on the value of each value-bearing document.

39. The computer program product of claim 33 wherein selecting an encryption key from a predetermined set of n encryption keys includes randomly or pseudo-randomly selecting the encryption key.

40. The computer program product of claim 33 wherein encrypting each of the value-bearing documents using one of the selected encryption keys includes utilizing a symmetric encryption algorithm to encrypt the value-bearing documents.

41. The computer program product of claim 33 wherein encrypting each of the value-bearing documents using one of the selected encryption keys includes utilizing an asymmetric encryption algorithm to encrypt the value-bearing documents.

42. The computer program product of claim 33 wherein steps (a)–(d) are performed by an issuer module.

43. The computer program product of claim 33 wherein steps (a)–(d) are performed by a guarantor module.

44. The computer program product of claim 33 wherein steps (a)–(d) are performed by a combination issuer/guarantor module.

45. The computer program product of claim 33 wherein generating messages includes generating dynamic transaction protocol messages, each dynamic transaction protocol message including a length field for storing a length value indicating the length of the encrypted value-bearing document, an encryption scheme index field for storing the encryption scheme index, and a message digest field for storing an encrypted message digest of the encrypted value-bearing document.

* * * * *